No. 660,981. Patented Oct. 30, 1900.
N. M. BARNES.
BICYCLE.
(Application filed Jan. 13, 1900.)
(No Model.)
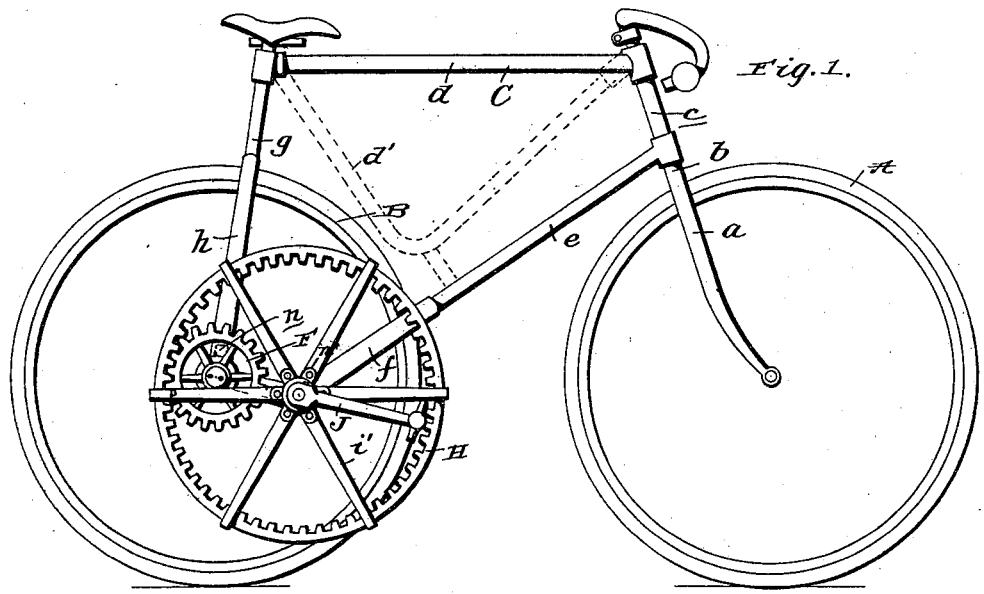
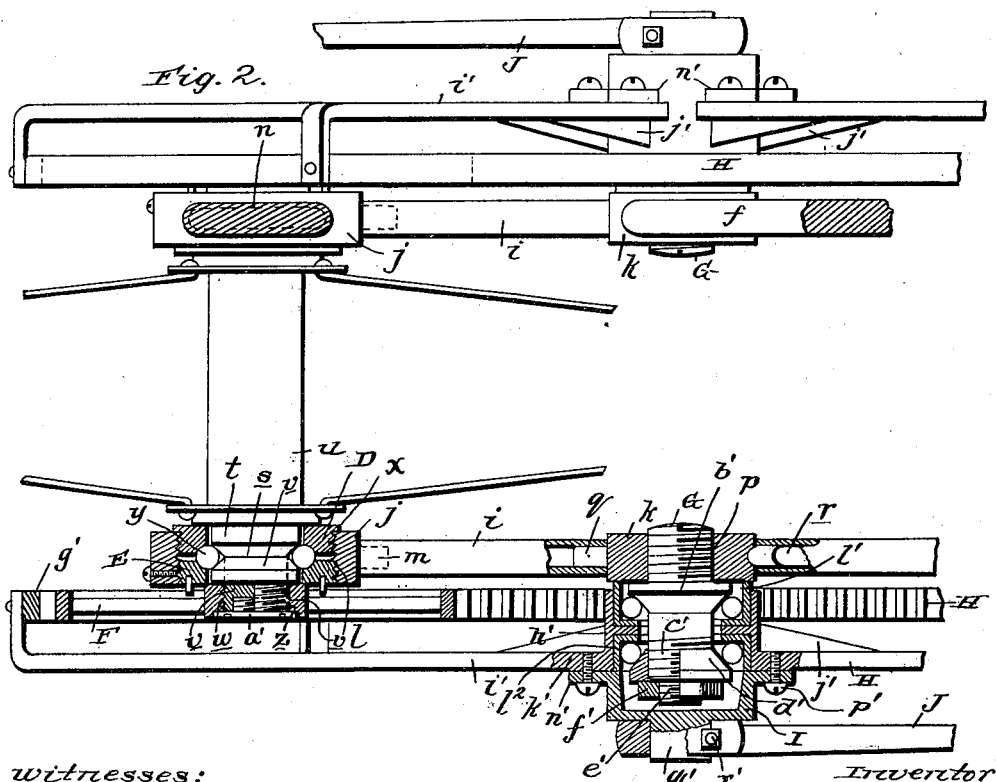
Witnesses:
Inventor
N. M. Barnes
By James J. Sheehy
Attorney

UNITED STATES PATENT OFFICE.

NATHAN M. BARNES, OF MINNEAPOLIS, MINNESOTA.

BICYCLE.

SPECIFICATION forming part of Letters Patent No. 660,981, dated October 30, 1900.

Application filed January 13, 1900. Serial No. 1,362. (No model.)

*To all whom it may concern:*

Be it known that I, NATHAN M. BARNES, a citizen of the United States, residing at Minneapolis, in the county of Hennepin and State of Minnesota, have invented new and useful Improvements in Bicycles, of which the following is a specification.

My invention relates to safety-bicycles having propelling mechanism of the crank-and-gear type, and is designed more particularly as an improvement upon the bicycle disclosed in my Letters Patent No. 619,118, of February 7, 1899.

It consists in the peculiar and advantageous construction hereinafter described, and particularly pointed out in the claims appended.

In the accompanying drawings, Figure 1 is a side elevation of a safety-bicycle constructed in accordance with my invention. Fig. 2 is an enlarged horizontal section of the rear portion of the bicycle, illustrating the frame construction and the driving-gear.

Referring by letter to the said drawings, A is the front or pilot wheel of the machine, which is mounted in the fork $a$ of a steering-post $b$, as usual.

B is the rear or drive wheel, and C is the main frame. The said frame is preferably of tubing and has the usual head-bar $c$ and top line-bar $d$. It also has a bottom line-bar $e$, which is peculiar in that it terminates at its rear end in a fork $f$, and a rear-seat post-tube $g$, which is peculiar in that it is fixedly joined at its upper end to the rear end of the top line-bar $d$ and has its lower portion shaped to form a fork $h$, designed to straddle the rear wheel B, as shown. The rear ends of the fork $f$ of the bottom line-bar and the lower ends of the fork of the seat-post tube $g$ are connected through the medium of short sections $i$, of tubing, and rings $j$ $k$, as shown. The rings $j$, which are interiorly threaded, as indicated by $l$, are interposed between the rear ends of the tube-sections $i$ and the lower ends of fork $h$ and are provided with lugs $m$ $n$, which are arranged in and connected by brazing to the ends of the tube-sections and fork, respectively, as shown. The rings $k$ are provided with threaded apertures $p$ and are also provided with exterior lugs $q$ $r$, which are secured by brazing in the forward ends of the tube-sections $i$ and the rear ends of the fork, respectively, as shown.

As will be readily observed from the foregoing, my improved frame C is neat in appearance and light in weight and at the same time is exceedingly stiff and strong, and hence capable of withstanding the shock and strains to which bicycle-frames are ordinarily subjected.

The rear wheel B is generally of the ordinary construction. It is peculiar, however, in that peripheral grooves $s$ of angular form in cross-section are formed in the extended end portions $t$ of its hub $u$, and said end portions $t$ are reduced and threaded at their outer ends, as indicated by $v$, and are provided in said outer ends with threaded sockets $w$, as shown.

The construction of the bearings and gearing at the opposite sides of the frame A is the same, and therefore a description of the bearings, gearing, and appurtenances shown in section in Fig. 2 will suffice to impart a clear understanding of the similar parts at the opposite side of the frame. Referring to such sectional part of Fig. 2, D is an annular bearing-cup screwed into the ring $j$ and having a flange $x$ bearing against the inner side of the same, and E is an adjustable exteriorly-threaded bearing-cup screwed into the ring $j$ from the outside and having projections or other means for the engagement of a turning implement. These cups D E receive the extended end $t$ of the wheel-hub $u$, and anti-friction-balls $y$ are interposed between them and the hub, which balls run in the groove $v$, as shown. When it is desired to adjust the cup E, it is simply necessary to loosen the set-screw $y'$, which engages the same, and then turn said cup to the extent needed.

F is a gear-wheel having a central threaded aperture $z$, which receives the threaded end $v$ of the hub $u$ and is secured on said hub by a screw $a'$. This screw $a'$ takes into the socket $w$ of the hub and has its head countersunk in the other side of the wheel, as shown.

G is a journal screwed into the threaded aperture $p$ of the ring $k$ and extending laterally outward therefrom. This journal has a fixed cone $b'$, a threaded portion $c'$ to receive an adjustable cone $d'$, and a reduced and threaded end portion $e'$ to receive a nut $f'$, which has for its purpose to hold the adjustable cone against casual movement.

H is a comparatively large gear-wheel which in the preferred embodiment of the invention comprises a toothed annulus $g'$, which surrounds and is intermeshed with the gear-wheel F, a central hub $h'$, and spokes $i'$, interposed between the annulus or rim and the hub and having strengthening-ribs $j'$ at their inner sides. The hub $h'$ surrounds the journal G and is provided with an interior annular rib $k'$, at opposite sides of which cups $l'\ l^2$ of angular form in cross-section are arranged, as shown. These cups $l'\ l^2$, in conjunction with the cones $b'\ d'$, form races in which antifrictional balls $m'$ are arranged, as shown.

I is a cap which closes the outer end of the hub and prevents dust and dirt from gaining access to the bearings. This cap I has a flange $n'$, connected by screws $p'$ or other suitable means to the outer face of the wheel H, and also has a central projection $q'$, on which a crank J is fixed by a screw $r$ or other suitable means.

By virtue of the construction described it will be seen that when the gear-wheels H are turned by the rider through the medium of the oppositely-disposed cranks the gear-wheels or pinions F and the wheel B will also be turned, and because of the difference in the sizes of the wheels F H the wheels F and the traveling wheel B will be caused to make a number of revolutions to each revolution of the driving gear-wheels. It will also be observed that by virtue of the hubs $h'$ of the driving gear-wheels surrounding the journals G and extending quite close to the rings $k$ the bearings are entirely inclosed and dust and dirt are effectually excluded therefrom. While this is so, the removability of the caps of the hubs permits of ready access being had to the bearings when it is desired to adjust or lubricate the same. It will further be observed that by reason of the manner of fixing the gear-wheels F on the ends of the hub of wheel B and the manner of mounting the gear-wheels H on the journals G a narrow tread is afforded, which is an important advantage.

When my improvements are embraced in a woman's bicycle, a suitable drop-bar $d'$, such as shown by broken lines in Fig. 1, is used in the frame C in lieu of the top line-bar $d$.

Having thus described my invention, what I claim is—

1. In a bicycle, the combination with the frame comprising the head-bar, the top line-bar, the bottom line-bar terminating at its rear end in a tubular fork, the upright seat-post tube fixedly joined to the rear end of the top line-bar and terminating at its lower end in a tubular fork, the short tube-sections $i$ arranged between the ends of the said forks, the interiorly-threaded rings interposed between the rear ends of the tube-sections $i$ and the ends of the tubular fork of the seat-post tube and having the lugs brazed in said ends, and the interiorly-threaded rings interposed between the forward ends of the tube-sections $i$ and the ends of the tubular fork on the bottom line-bar and having lugs brazed in said ends; of annular threaded cups arranged in the rear rings of the frame, the rear or drive wheel having its hub extended through the bearing-cups and provided with peripheral grooves, antifriction-balls arranged in said grooves and interposed between the hub and the cups, gear-wheels fixed on the ends of the hub and having their outer sides flush with said ends, journals screwed into and extending laterally outward from the forward rings and having fixed and adjustable cones, gear-wheels surrounding and intermeshed with the gear-wheels on the hub of the traveling wheel and having hubs surrounding the journals, antifriction-balls interposed between the cones of the journals and the hubs of said gear-wheels, removable caps connected to the outer side of said gear-wheels and closing the outer ends of the hubs, and cranks fixed on said caps, substantially as specified.

2. The herein-described bicycle-frame consisting essentially of the head-bar, the top line-bar, the bottom line-bar, terminating at its rear end in a tubular fork, the upright seat-post tube fixedly joined to the rear end of the top line-bar and terminating at its lower end in a tubular fork, the short tube-sections $i$ arranged between the ends of the said tubular forks, the interiorly-threaded rings $j$ interposed between the rear ends of the tube-sections $i$ and the ends of the tubular fork of the seat-post tube and having the lugs $m\ n$ brazed in the rear ends of the sections $i$ and the ends of the fork of the seat-post tube, respectively; the said rings being adapted to receive the journal-bearings of a rear wheel, and rings $k$ interposed between and having lugs brazed in the forward ends of the tube-sections $i$ and the ends of the tubular fork of the bottom line-bar; the said rings being interiorly threaded whereby they are adapted for the connection of journals, substantially as specified.

In testimony whereof I have hereunto set my hand in presence of two subscribing witnesses.

NATHAN M. BARNES.

Witnesses:
J. T. McCRAIG,
B. C. TORELLE.